INVENTOR
JEAN SCHAAD
BY Kenwood Ross
ATTORNEY

United States Patent Office 3,462,940
Patented Aug. 26, 1969

3,462,940
DEVICE FOR INFLUENCING THE FREQUENCY OF A MECHANICAL RESONATOR
Jean Schaad, Gorgier, Switzerland, assignor to Voumard Machines Co. S.A., La Chaux-de-Fonds, Neuchatel, Switzerland, a firm of Switzerland
Filed Mar. 20, 1967, Ser. No. 624,325
Claims priority, application Switzerland, Mar. 25, 1966, 4,393/66
Int. Cl. G04c 3/00
U.S. Cl. 58—23                                    1 Claim

ABSTRACT OF THE DISCLOSURE

A mechanical resonator whose frequency varies according to its spatial position under the effect of gravity. The resonator has such frequency variations compensated by magnetic action which is arranged to vary according to the spatial position, the varying of the magnetic action being effected by the interaction between a permanent magnet element and a magnetic material element. One of these later named elements may be fixed to the resonating member, if desired.

---

A mechanical resonator, whose frequency varies according to its spatial position under the effect of gravity, has such frequency variations compensated by magnetic action itself arranged to vary according to the spatial position. The varying of the magnetic action may be effected by the interaction between a permanent magnet element and a magnetic material element, one of these elements being fixed to the resonating member, if desired.

The present invention relates to mechanical resonators and more particularly to a means enabling the frequency of a mechanical resonator to be influenced.

Mechanical resonators, especially those which are used as frequency standards for time measurement, are generally sensitive to the effect of gravity, in such manner that the frequency of their oscillations varies with their position. This is the case, for example, with tuning forks which are used in portable timing instruments.

It is an object of the present invention to provide a method and device to automatically correct the frequency of the tuning fork.

According to the invention, there is provided a method enabling the frequency of a mechanical resonator to be influenced which comprises subjecting the resonator to a magnetic action, the magnetic action being subject to variation under the effect of gravity as a function of the spatial position of the resonator, the variation being such as to compensate substantially for the effects of gravity on the frequency of the resonator.

The invention comprises a permanent magnet element and an element of magnetic material, an oscillating member carrying one of the elements so that the magnetic action is exerted upon the oscillating member to influence its frequency, and a gravity-actuated means for allowing variations in the magnetic action in such a way that the effects of gravity on the frequency of the resonator are substantially compensated by the magnetic action.

Figures 1, 2:
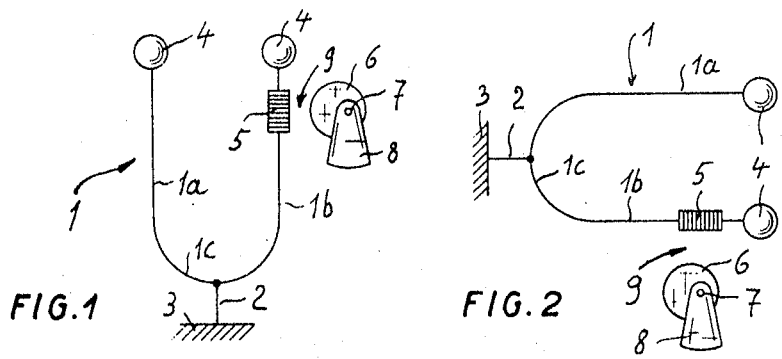
Figures 3, 4:
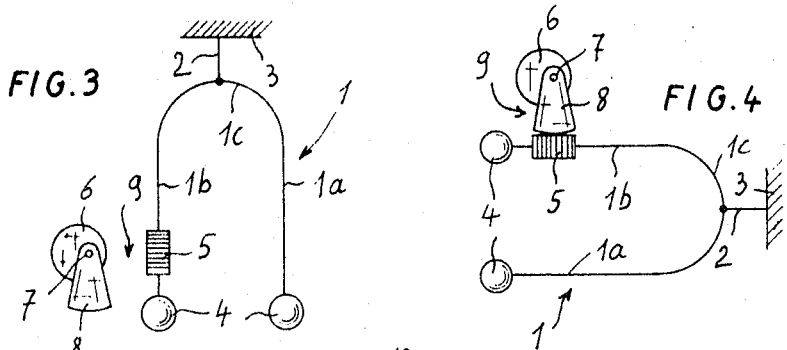
Figures 5, 6:
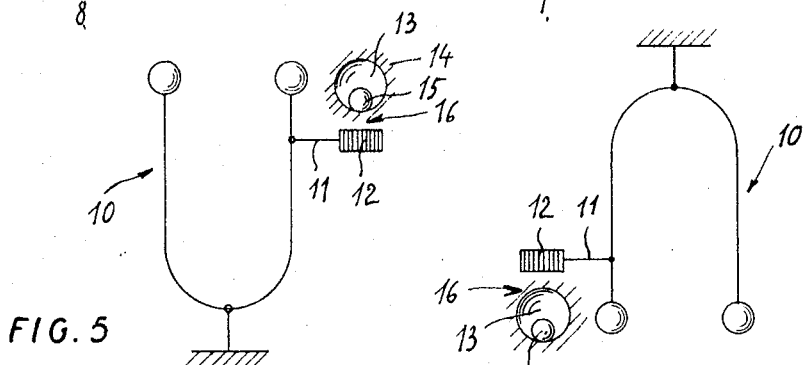
Figure 7:
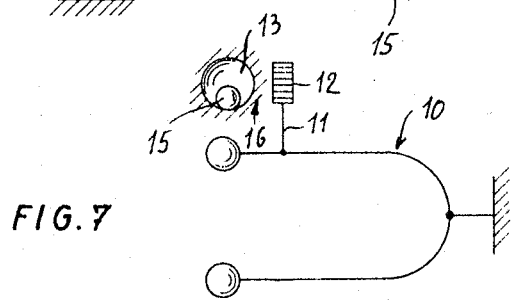

In order that the invention may be more fully understood, two embodiments of a device according to the invention will be described below, purely by way of illustrative examples, with reference to the accompanying drawings, in which:

FIGURES 1 to 4 show schematically, viewed in elevation, a first embodiment in the form of a tuning fork, respectively in four functioning positions; and FIGURES 5 to 7 show schematically, another embodiment in the form of a tuning fork, viewed in elevation, in three operating positions.

In the drawings, the tuning fork shown in FIGURES 1 to 4, which constitutes the standard of frequency of a timepiece, is designated, in a general manner, by 1. It comprises two flexible prongs 1a and 1b, connected at one of their ends by a median part 1c which is rigidly fixed to a stem, designated by 2, clamped in a support 3. The ends of the flexible prongs 1a and 1b have two masses 4, schematically represented by spheres and constituted by elements of a transducer intended to maintain the oscillations of the tuning fork.

In order to make this tuning fork independent of the effects of the gravity, its prong 1b carries a permanent magnet 5 which moves, at the time of oscillations of the tuning fork, in the vicinity of an eccentric 6, of magnetic metal, pivoted at 7 on the frame of the movement of the timepiece. This eccentric is rigidly attached to an imbalance 8 in such a way that it is driven in rotation, by this imbalance, when the position of the timepiece changes. As a result of this, the air-gap, designated by 9, between the permanent magnet 5 and the eccentric of magnetic metal 6, varies as a function of the positions which the timepiece occupies.

The magnetic effect of the magnet and of the eccentric 6 influence the frequency of the oscillations of the tuning fork 1, and this effect varies with the air-gap 9 and, consequently, itself also varies with the position of the timepiece. This arrangement therefore allows for the compensation of the effects that gravity can have on the frequency of the tuning fork: it is thus that, in the position represented in FIGURE 1, the effect of gravity reduces the frequency of the tuning fork. In this position, the air-gap 9 is least, so that the magnetic effect augments the frequency of the tuning fork and compensates for the effects of gravity.

In this first embodiment, the compensating device acts, in the plane of the tuning fork, in such a way that it only compensates for the effect due to changes of position in the plane.

In the embodiment of FIGURES 5 to 7, the effect of the compensator device is spatial: one of the prongs of the tuning fork, designated by 10, carries a stem 11 at the end of which is fixed a permanent magnet 12. The latter moves, in the course of the oscillations of the tuning fork, in the vicinity of a spherical cavity 13 arranged in a massive member 14 of the timepiece, and in which a ball 15 of magnetic metal moves freely.

The position of the ball 15 in the spherical cavity 13, and, consequently, its distance from the magnet 12, varies with the changes of position of the timepiece, not only in the plane of the tuning fork, but also in any direction outside of this plane.

As in the preceding example, the magnetic effect of the permanent magnet 12 and of the ball 15 varies with the air-gap, designated by 16, so that the effects of position on the frequency of the tuning fork are thus compensated for.

In a variation, the tuning fork can carry the piece of magnetic metal and the permanent magnet can be mounted on the frame of the timepiece.

Also in a variation, the prongs of the tuning fork can both be subjected to the action of the compensating device: In fact, the correction is very slight with respect to the tolerance of the symmetry of the two prongs.

Although in the examples described and represented, the resonator is a tuning fork, it is to be noted that the invention applies to all mechanical resonators sensitive to the effect of position.

What I claim is:

1. In a timepiece, a device for facilitating the automatic correction of the frequency of a tuning fork mechanical resonator by compensating for the gravitational effect on the resonator, comprising:
- a permanent magnet element carried by and influencing the oscillations of one of the tines of the tuning fork of the resonator,
- an element of magnetic material eccentrically mounted on the frame of the timepiece and spaced from the permanent magnet element with an air-gap therebetween,
- the magnet-carrying tine being movable on oscillation of the tuning fork of the resonator in the vicinity of the element of magnetic material,
- an imbalance for rotating the element of magnetic material as the position of the timepiece changes,
- with the air-gap varying as a function of the positions occupied by the timepiece,
- and with the magnetic effect of the permanent magnet element and the element of magnetic material influencing the frequency of oscillations of the tuning fork and varying with the air-gap according to the position of the timepiece.

References Cited

UNITED STATES PATENTS 3,338,047  8/1967  Kueffer _____ 84—457 X

STEPHEN J. TOMSKY, Primary Examiner

JOHN F. GONZALES, Assistant Examiner

U.S. Cl. X.R.

84—457; 310—25